(12) United States Patent
Ushiku

(10) Patent No.: US 7,665,065 B2
(45) Date of Patent: Feb. 16, 2010

(54) SOFTWARE TERMINATION METHOD

(75) Inventor: Toyohiko Ushiku, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 721 days.

(21) Appl. No.: 11/202,501

(22) Filed: Aug. 12, 2005

(65) Prior Publication Data

US 2006/0048108 A1 Mar. 2, 2006

(30) Foreign Application Priority Data

Aug. 25, 2004 (JP) ............................. 2004-245094

(51) Int. Cl.
*G06F 9/44* (2006.01)
*G06F 9/45* (2006.01)

(52) U.S. Cl. ...................... 717/120; 717/144

(58) Field of Classification Search ................. 717/120, 717/140, 144, 157
See application file for complete search history.

(56) References Cited

U.S. PATENT DOCUMENTS

| | | | | |
|---|---|---|---|---|
| 4,970,639 | A * | 11/1990 | Diefendorf et al. .......... | 717/174 |
| 5,247,666 | A * | 9/1993 | Buckwold .................... | 707/100 |
| 5,428,780 | A * | 6/1995 | England et al. .............. | 717/142 |
| 5,862,385 | A * | 1/1999 | Iitsuka ........................ | 717/156 |
| 6,226,694 | B1 * | 5/2001 | Constant et al. ............. | 713/375 |
| 6,487,580 | B1 * | 11/2002 | Bobak et al. ................. | 718/106 |
| 6,519,764 | B1 * | 2/2003 | Atkinson et al. ............. | 717/120 |
| 6,910,210 | B1 * | 6/2005 | Chew .......................... | 718/103 |
| 7,386,752 | B1 * | 6/2008 | Rakic et al. .................... | 714/2 |
| 2004/0193401 | A1 * | 9/2004 | Ringger et al. ................. | 704/9 |
| 2005/0246693 | A1 * | 11/2005 | Plum ........................... | 717/140 |
| 2006/0004563 | A1 * | 1/2006 | Campbell et al. .............. | 704/9 |

FOREIGN PATENT DOCUMENTS

| | | |
|---|---|---|
| JP | 2002-297403 A | 10/2000 |
| JP | 2002-196939 A | 7/2002 |
| JP | 2002-351677 A | 12/2002 |

OTHER PUBLICATIONS

Assmann "Graph rewrite systems for program optimization", Jul. 2000, ACM, TOPLAS vol. 22, Issue 4, pp. 583-637.*
Madhavan et al. "Composing Mappings Among Data Sources", Sep. 2003, VLDB Endowment, vol. 29, 12 pages.*
Oflazer "Dependency Parsing with an Extended Finite-state Approach", Dec. 2003, MIT Press, vol. 29, Issue 4, pp. 515-544.*
"OSGi Service Platform Release 3", Open Service Gateway Initiative, Mar. 2003, pp. 137 to 146.

* cited by examiner

*Primary Examiner*—Anna Deng
(74) *Attorney, Agent, or Firm*—Canon U.S.A., Inc., IP Division

(57) ABSTRACT

A software system terminates software modules in the reverse order of startup defined in a bundle start order list. Additionally, the software modules can be terminated in the order obtained by representing a static or dynamic reference relationship among the software modules as a tree structure and by searching the tree structure on a depth-first basis.

6 Claims, 14 Drawing Sheets

FIG. 5

Framework implementation ~2010
BundleActivator implementation
Bundle control implementation ~2025

510 start (ID)
515 acquire_header (key)
520 create()
525 start (BundleContext)
530 register_service()
535 acquire_service()
540 set_state (ACTIVE)
545 register_state (ID, ACTIVE)
548 register_in_start_order_list (ID)
550 stop (ID)
555 stop (BundleContext)
560 return_service (ServiceReference)
565 unregister_service (ServiceRegistration)
570 set_state (RESOLVED)
575 register_state (ID, RESOLVED)
580 delete_from_start_order_list Operator Example 1

SOFTWARE TERMINATION METHOD

BACKGROUND OF THE INVENTION

1. Field of the Invention

The present invention relates to a software system including a plurality of program modules.

2. Description of the Related Art

In known software systems including a plurality of program modules, some systems have start order control means that controls the order of starting the program modules at system start-up time (refer to, for example, Japanese Patent Laid-Open No. 2002-196939, Japanese Patent Laid-Open No. 2002-297403, Japanese Patent Laid-Open No. 2002-351677, and "OSGi Service Platform Release 3", Open Service Gateway Initiative, March 2003).

In general, the purpose of controlling the start order is to satisfy dependency relationships among program modules so that, when some program module uses a function provided by a different program module, the program module that provides a function is started first to avoid the failure of the start-up of the program module that uses the function.

In embedded devices, at power-on time an initialization program is started so as to start up programs required for system operation and initialize these programs.

In known embedded devices, in many cases at power-off time, execution of the programs forcibly terminates by turning off a power switch and shutting off electric power.

If electric power is forcibly shut off, data that is stored in a volatile memory, such as a dynamic RAM (random access memory), and that is not stored in a non-volatile memory, such as a static RAM and a hard disk, is lost. Additionally, in a system including a hard disk, the hard disk may suffer physical damage or loss of stored data due to loss of power during writing data onto the hard disk.

To prevent this situation, some embedded devices carry out a system stopping operation known as a shutdown operation so that a process being carried out by a program module is safely terminated or data stored only in a volatile memory is transferred to a non-volatile memory.

However, if, as in a start-up operation, a program module uses a function provided by a different program module during the shutdown operation and if the program module that provides the function terminates first, the program module that uses the function is not able to terminate normally. That is, the termination process fails, which is a problem.

In the method disclosed in Japanese Patent Laid-Open No. 2002-196939, in order to start or terminate a program module added to a system while the system is running, a definition file that defines the order of starting and termination needs to be re-written every time a program module is added, which is also a problem.

SUMMARY OF THE INVENTION

The present invention provides a simple and safe system termination method.

The present invention further provides a method in which the order of termination of program modules having a dependency relationship is determined as a safe termination order.

The present invention further provides a system having high system safety.

The present invention further provides a software system that terminates program modules in an order depending on the order of starting the program modules.

The present invention still further provides a software system that terminates program modules in an order depending on the dependency relationship or the usage relationship of the program modules.

According to an embodiment of the present invention, a software system includes starting means for starting program modules and terminating means for terminating the program modules started by the starting means based on the startup order of the program modules started by the starting means.

According to an embodiment of the present invention, a software system includes derivation means for deriving a tree structure representing a dependency relationship among program modules from a dependency relationship among the program modules and terminating means for terminating the program modules in the order based on the tree structure derived by the derivation means.

According to an embodiment of the present invention, a software system includes management means for managing a program module that registers a service and a program module that uses the service, derivation means for deriving a tree structure representing a usage relationship between the program modules from the program module that registers a service and the program module that uses the service, and terminating means for terminating the program modules in the order based on the tree structure derived by the derivation means.

According to an embodiment of the present invention, a method for terminating program modules in a software system includes a starting step for starting program modules and a terminating step for terminating the program modules started at the starting step based on the startup order of the program modules started at the starting step.

According to an embodiment of the present invention, a method for terminating program modules in a software system includes a derivation step for deriving a tree structure representing a dependency relationship among program modules from a dependency relationship among the program modules and a terminating step for terminating the program modules in the order based on the tree structure derived at the derivation step.

According to an embodiment of the present invention, a method for terminating program modules in a software system includes a management step for managing a program module that registers a service and a program module that uses the service, a derivation step for deriving a tree structure representing a usage relationship between the program modules from the program module that registers a service and the program module that uses the service, and a terminating step for terminating the program modules in the order based on the tree structure derived at the derivation step.

According to an embodiment of the present invention, a program for terminating program modules of a software system includes a starting step for starting program modules and a terminating step for terminating the program modules started at the starting step based on the startup order of the program modules started at the starting step.

According to an embodiment of the present invention, a program for terminating program modules of a software system includes a derivation step for deriving a tree structure representing a dependency relationship among program modules from a dependency relationship among the program modules and a terminating step for terminating the program modules in the order based on the tree structure derived at the derivation step.

According to an embodiment of the present invention, a program for terminating program modules of a software system includes a management step for managing a program module that registers a service and a program module that uses the service, a derivation step for deriving a tree structure representing a usage relationship between the program modules from the program module that registers a service and the program module that uses the service, and a terminating step for terminating the program modules in the order based on the tree structure derived at the derivation step.

Further features of the present invention will become apparent from the following description of exemplary embodiments with reference to the attached drawings.

BRIEF DESCRIPTION OF THE DRAWINGS

FIG. 5 is a flow chart of a process for starting/terminating a bundle.

DESCRIPTION OF THE EMBODIMENTS

In the following exemplary embodiments, the employed order of terminating software modules is as follows:
(1) An order different from that used for starting the software modules
(2) The reverse order of that used for starting the software modules (a first embodiment)
(3) An order determined on a depth-first basis in a tree structure representing a static reference relationship among the software modules (second and third embodiments)
(4) An order determined by the calculated weight of nodes in the tree structure in (3) (the third embodiment)
(5) An order determined by searching, on a depth-first basis, a tree structure representing a dynamic reference relationship among the software modules (a fourth embodiment)
(6) An order determined by the calculated weight of nodes in the tree structure in (5) (the fourth embodiment)

First Embodiment

A first embodiment of the present invention is described with reference to the accompanying drawings. In this embodiment, when a software system includes a plurality of program modules and the plurality of program modules have dependencies with each other, a system for controlling the termination order of each program module in order to safely terminate the software system and software for achieving the system are described.

Figure 1:
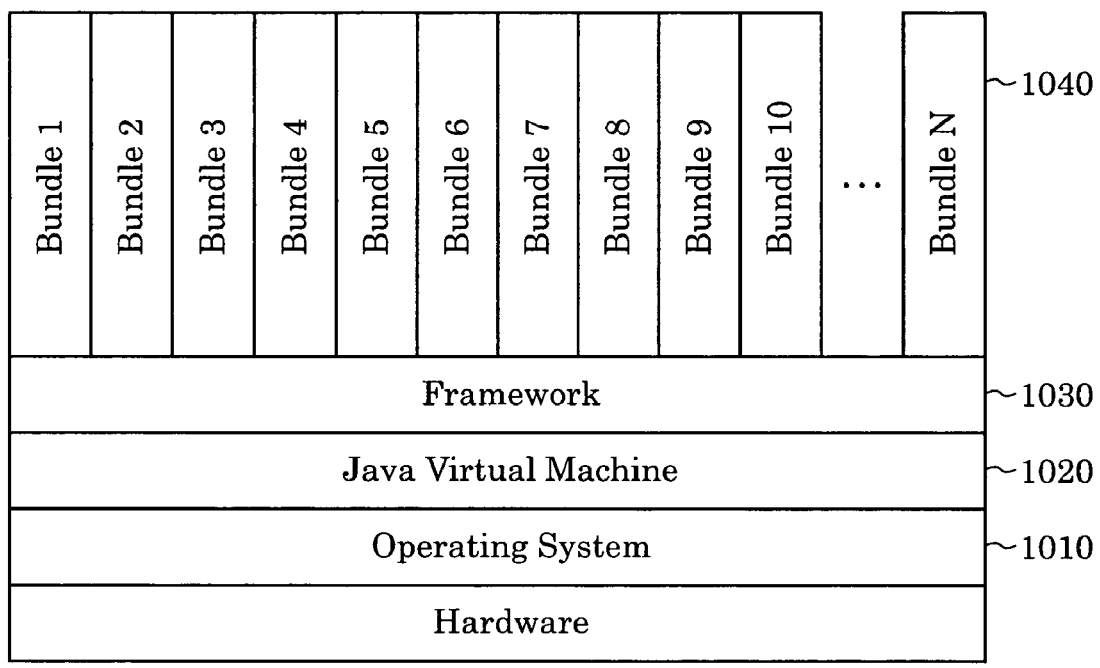
FIG. 1 illustrates the structure of software according to an embodiment of the present invention.

FIG. 1 illustrates the configuration of software running in the system according to an embodiment of the present invention. This configuration complies with the OSGi service platform written in "OSGi Service Platform Release 3" (Open Service Gateway Initiative, March, 2003).

As shown in FIG. 1, the configuration includes an operating system 1010 for controlling hardware and software; a Java virtual machine 1020 running on the operating system 1010 to interpret and execute a byte code, which is an intermediate language generated by Java language ("Java" is a trade mark of Sun Microsystems, Inc.); a framework 1030 for allowing a variety of Java-based applications to run on a single Java virtual machine 1020 (the framework 1030 is also written in Java); and a bundle 1040, which is an application unit running on the framework 1030 and which is managed by the framework 1030.

The bundle 1040 embeds Java-based programs serving as an application. The bundle 1040 further embeds image data and a variety of file data used for the application. The framework 1030 has a function to independently install the bundle 1040 in the framework 1030 and uninstall the bundle 1040 from the framework 1030, a function to update the bundle 1040 installed, and a function to start and terminate the installed bundle 1040.

Figure 2:
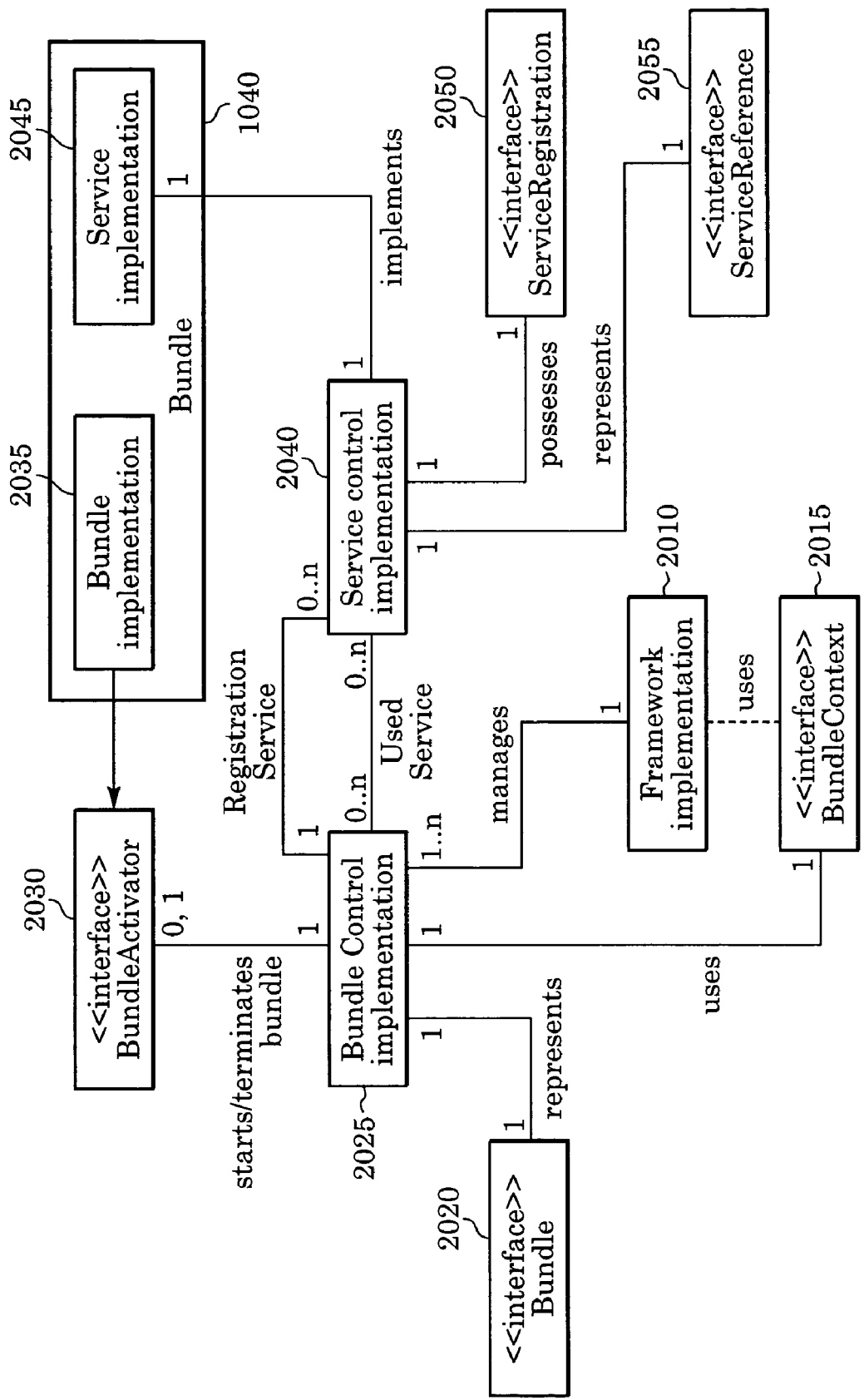
FIG. 2 illustrates the class structure of a framework according to the embodiment of the present invention.

FIG. 2 illustrates the structure of main Java classes of the framework 1030. As shown in FIG. 2, a framework implementation class 2010 provides a primary function of the framework 1030. A BundleContext interface 2015 defines an interface used for externally accessing a function implemented by the framework implementation class 2010. A Bundle interface 2020 defines an interface to access the bundle 1040 from another bundle. A bundle control implementation class 2025 is created to manage the bundle 1040 on the framework 1030. A BundleActivator interface 2030 defines a method called by the framework 1030 when starting or terminating the bundle 1040. A bundle implementation 2035 implements the BundleActivator interface 2030 in the bundle 1040. A service control implementation 2040 manages, on the framework 1030, services provided by the bundle 1040 to other bundles. A service implementation 2045 actually implements a service which the bundle 1040 provides in the bundle 1040. A ServiceRegistration interface 2050 is an interface used for accessing service registration data. A ServiceReference interface 2055 is an interface used for accessing service data when using a service.

Figure 3:
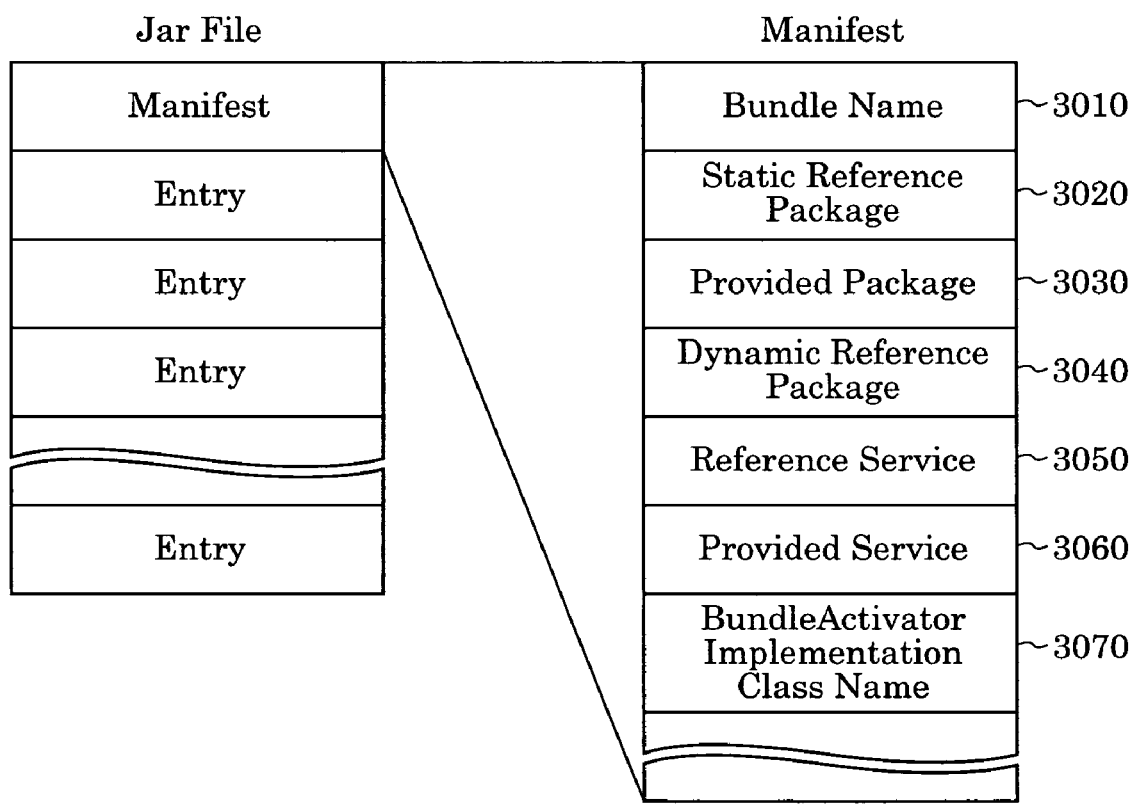
FIG. 3 illustrates the structures of a Jar file and a manifest.

FIG. 3 illustrates the structure of a Jar file, which is an archive file used for installing the bundle 1040, and also illustrates bundle attributes written in a manifest header, which is a header of the Jar file defining a bundle (hereinafter referred to as a "bundle file"). It should be noted that the bundle attributes are not necessarily specified and the order of the attributes is not prescribed.

As shown in FIG. 3, a bundle name 3010 represents the name of the bundle 1040. A static reference package 3020 is a name list of Java packages provided by another bundle 1040 and referenced by the bundle 1040. A provided package 3030 is a name list of Java packages provided by the bundle 1040 to other bundles 1040. Like the static reference package 3020, a dynamic reference package 3040 is a name list of Java packages referenced by the bundle 1040. However, the static reference package 3020 requires reference resolution at start-up time of the bundle 1040, whereas the dynamic reference package 3040 only requires reference resolution when required. A reference service 3050 defines services used among services provided by other bundles 1040. A providing service 3060 defines services that can be provided to other bundles 1040. A BundleActivator implementation class name 3070 defines the name of a class which implements the BundleActivator interface 2030.

The install process, in which data to be referenced at system shutdown time is created, the start/stop process of a bundle, the restart process of the system, and the system shutdown process are described below.

<Install Process>

Figure 4:
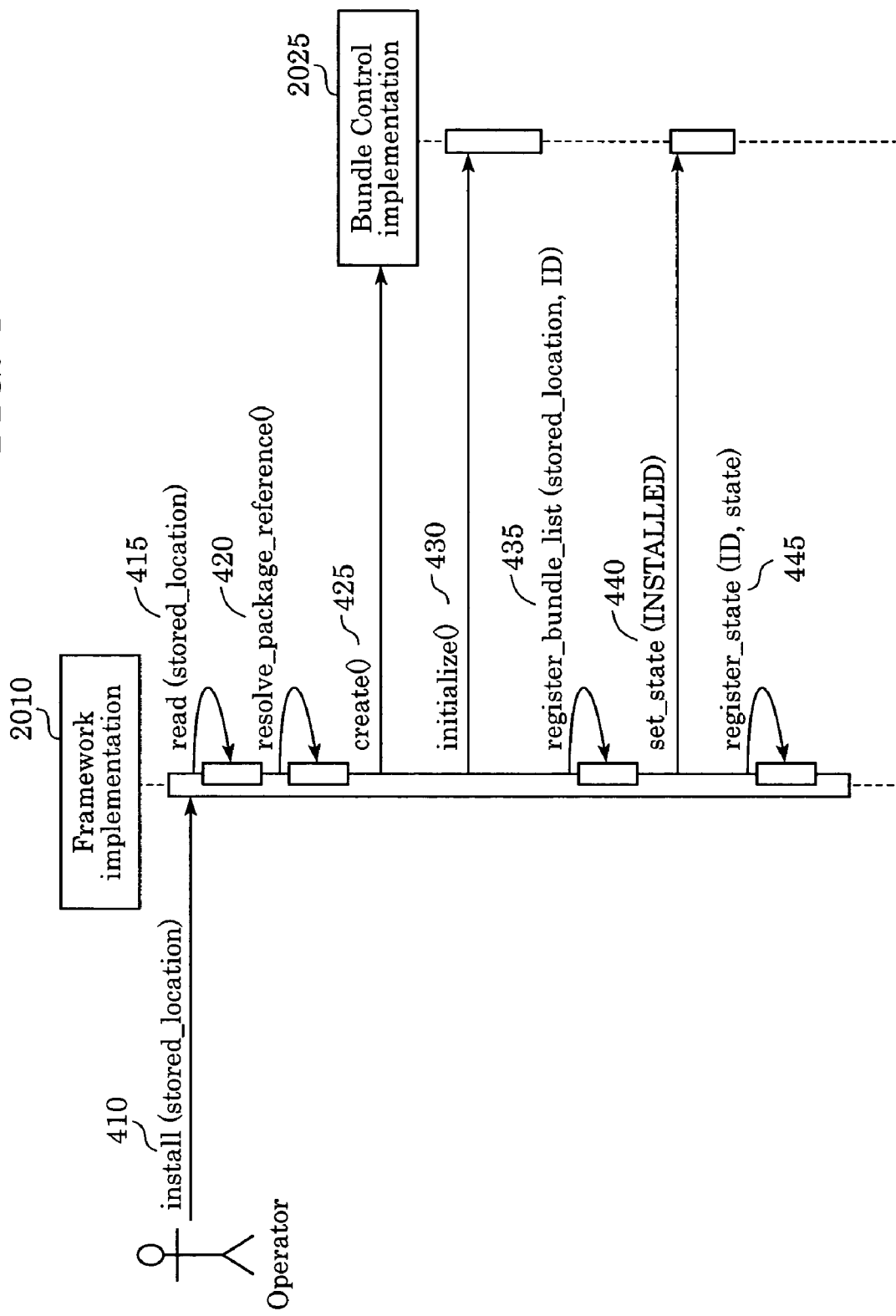
FIG. 4 is a flow chart of a process for installing a bundle.

The process to install the bundle 1040 in the framework 1030 is described with reference to FIG. 4. In this embodiment, a program module is installed in the software system after the software system starts.

A system operator specifies a location where the bundle file is stored using a uniform resource locators (URL) and instructs the framework implementation class 2010 to install the bundle file stored at the specified location (step 410).

The framework implementation class 2010 inputs the bundle file from the stored location and then stores data of the input bundle file in a cache so that the framework implementation class 2010 can easily refer to the data in the framework 1030 (step 415).

The framework implementation class 2010 then reads out the provided package 3030 and the static reference package 3020 from the manifest of the input bundle file (i.e., from the header defining attributes of the Jar file). A Java package provided by each bundle 1040 is stored in a provided package registry of the framework implementation class 2010 along with a bundle ID of the bundle 1040. If a reference package written in the static reference package 3020 has already been registered in the provided package registry or if the reference package written in the static reference package 3020 is written in the provided package 3030, the process continues (step 420). Otherwise, the process stops by generating an exception indicating that the install process failed.

The framework implementation class 2010 then creates an object of the bundle control implementation class 2025 (step 425) and initializes the object using information in the manifest of the bundle file (step 430). The bundle control implementation class 2025 manages the information in the manifest, which can be referenced by using a character string representing an entry of each manifest header as a key. A bundle ID is assigned to a bundle in order to uniquely identify the bundle.

Figure 8:
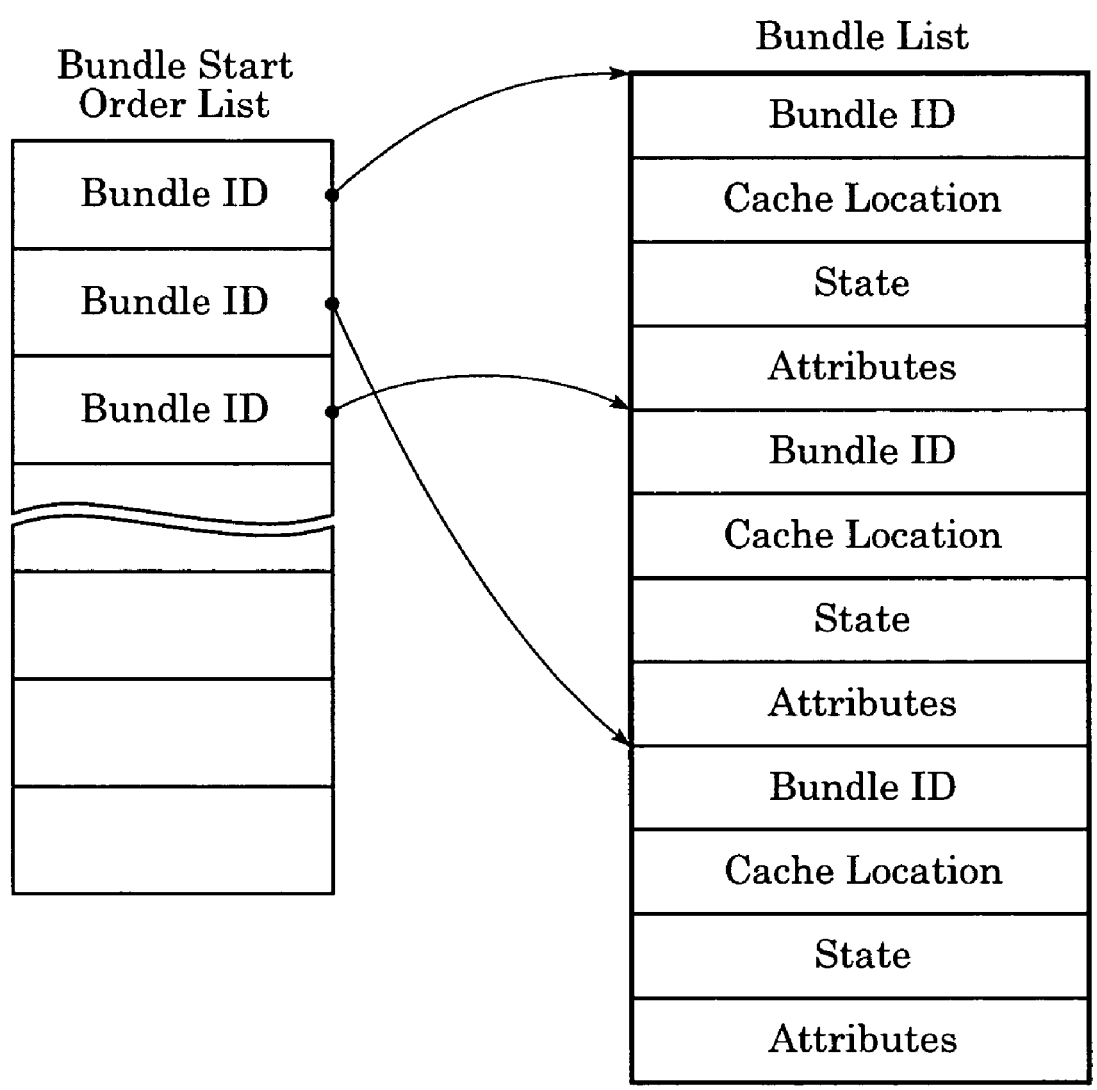
FIG. 8 illustrates the structures of a bundle list and a bundle termination order list.

A bundle list having a structure shown in FIG. 8 is generated by the framework implementation class 2010. The framework implementation class 2010 creates an entry for a newly installed bundle using information such as a bundle ID and a stored location in the cache and appends the entry to the end of the bundle list (step 435). The bundle list is stored in a non-volatile memory (e.g., a hard disk).

The state "INSTALLED" is set in the bundle control implementation class 2025 to indicate that the bundle is installed (step 440).

The framework implementation class 2010 searches for a bundle list entry for the bundle to be installed in the bundle list (see FIG. 8) using a bundle ID as a key. The framework implementation class 2010 then changes the state in the entry to "INSTALLED" (step 445).

Thus, the bundle 1040 is installed in the framework 1030.

<Start/Stop Process of Bundle>

The start/stop process of the bundle 1040 is described next with reference to FIG. 5. In this embodiment, program modules installed through the above-described install process are started by individually specifying the modules, and the program modules are terminated by individually specifying the modules.

When the framework implementation class 2010 receives, from an operator, an instruction to start a bundle by specifying the bundle ID thereof (step 510), the framework implementation class 2010 detects the bundle control implementation class 2025 corresponding to the bundle ID based on the specified bundle ID.

A character string indicating a BundleActivator implementation class name 3070 is given to the bundle control implementation class 2025 as a key to acquire data of the BundleActivator implementation class name 3070 (step 515).

When the BundleActivator implementation class name 3070 is defined, the framework implementation class 2010 loads a class identified by the BundleActivator implementation class name 3070 to create an object (step 520). The created BundleActivator object is stored in the bundle control implementation class 2025. The framework implementation class 2010 then invokes a "start" method of the created BundleActivator object to start an initialization routine defined for each bundle 1040 (step 525).

In the initialization routine, a service provided by the bundle 1040 registers with the framework implementation class 2010 (step 530) and a ServiceRegistration object representing the registered service is acquired. Alternatively, a service used for the bundle 1040 is searched for among services registered in the framework implementation class 2010 to acquire a ServiceReference object representing the searched service and to acquire a service object (step 535).

When the start process is successfully carried out, the bundle control implementation class 2025 is set to an "ACTIVE" mode, which indicates that the bundle 1040 is started (step 540).

The "ACTIVE" mode is also set to a mode field in an entry of the bundle list (see FIG. 8) corresponding to the bundle 1040 and is permanently recorded (step 545).

In addition, the framework implementation class 2010 holds a bundle start order list shown in FIG. 8. Like the bundle list, the bundle start order list is permanently recorded. The bundle ID of the started bundle is appended to the end of the bundle start order list (step 548). The bundle start order list defines the start order of the program modules at start-up time of the software system.

The stop process is described next. In this embodiment, the program modules started through the above-described start process are terminated by individually specifying the modules.

When the framework implementation class 2010 receives, from an operator, an instruction to terminate a bundle by specifying the bundle ID thereof (step 550), the framework implementation class 2010 detects the bundle control implementation class 2025 corresponding to the bundle ID based on the specified bundle ID.

The framework implementation class 2010 acquires the BundleActivator object stored in the bundle control implementation class 2025. The framework implementation class 2010 then invokes a "stop" method of the BundleActivator object to execute a bundle stop routine defined for each bundle 1040 (step 555). In the stop routine, the service registered by the bundle 1040 is unregistered (step 565) and the service used is released (step 560).

When the stop process is successfully carried out, the bundle control implementation class 2025 is set to a "RESOLVED" mode, which indicates that the bundle 1040 is terminated (step 570).

Additionally, the "RESOLVED" mode is also set to a mode field in the entry of the bundle list (see FIG. 8) corresponding to the bundle 1040 and is permanently recorded (step 575). Furthermore, the entry including the bundle ID of the terminated bundle is deleted from the bundle start order list shown in FIG. 8 (step 580). Thus, the bundle start order list (see FIG. 8) can hold the start orders of the started bundles.

<System Re-Start Process>

Figure 6:
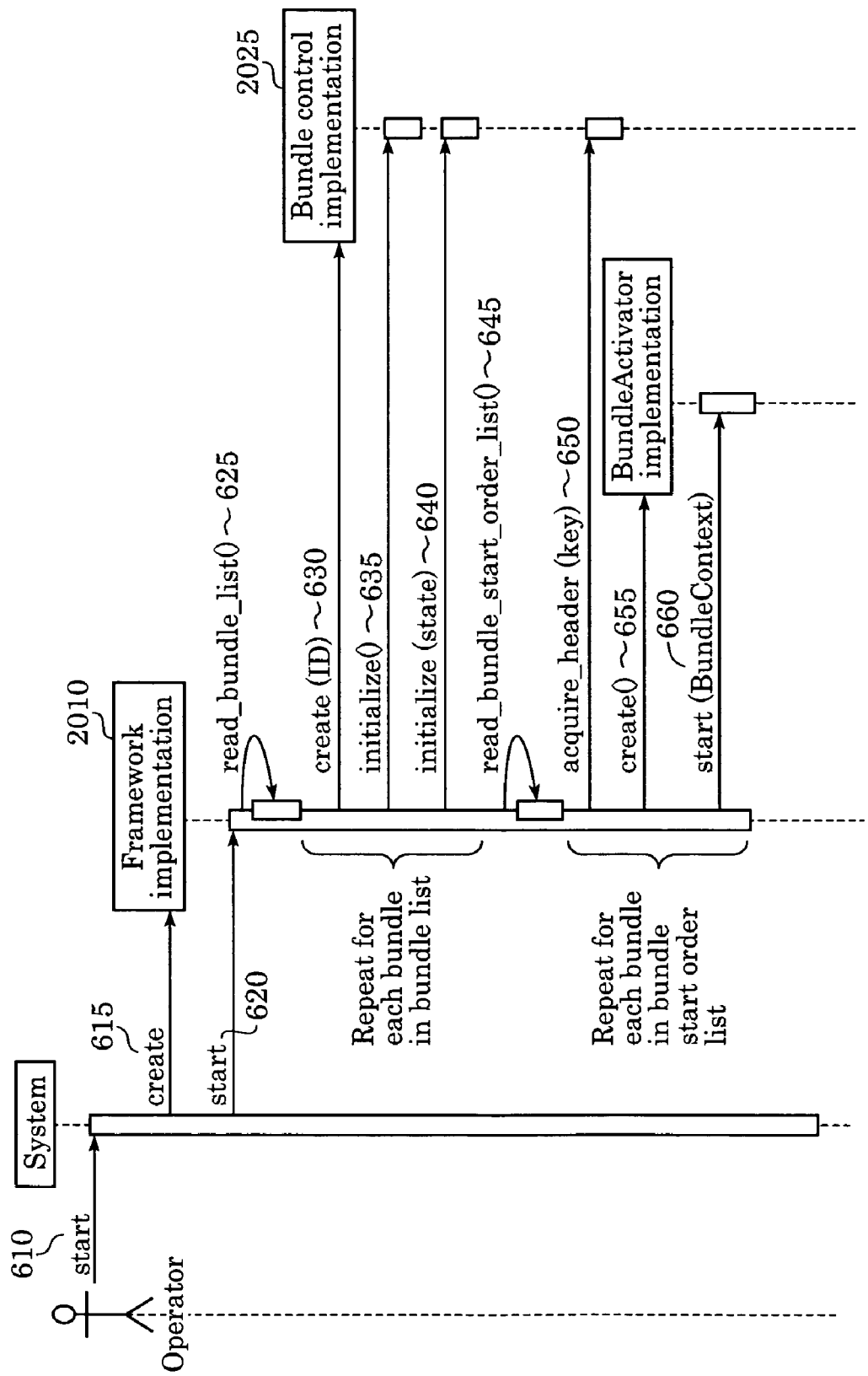
FIG. 6 is a flow chart of a process for restarting a system.

The system restart process is described with reference to FIG. 6. In this embodiment, the start order of program modules at software system start-up time is defined (i.e., the bundle start order list shown in FIG. 8). The program modules are started in accordance with the order (entry order). That is, when this system restarts, the system automatically starts bundles 1040 that were running until a system shutdown process starts (the system shutdown process is described below). This starting method is described next.

When the system starts (step 610), the framework implementation class 2010 is created (step 615).

When the framework implementation class 2010 starts (step 620), the permanently recorded bundle list (see FIG. 8) is read out (step 625).

A bundle control implementation class 2025 is created based on bundle information stored in the bundle list (step 630). The created bundle control implementation class 2025 is then initialized (step 635). Additionally, the bundle is set to the mode stored in the bundle list (step 640).

Furthermore, the permanently recorded bundle start order list (see FIG. 8) is read out (step 645). Bundle IDs are retrieved in the order of registration in the list. An object of the bundle control implementation class 2025 corresponding to the retrieved Bundle ID is searched for to start the bundle 1040 (steps 650, 655, and 660). This start process (steps 650, 655, and 660) is identical to the regular start process (steps 515, 520, and 525). Thus, the bundles 1040 are restarted in the start order before the system is shut down.

<System Shutdown Process>

Figure 7:
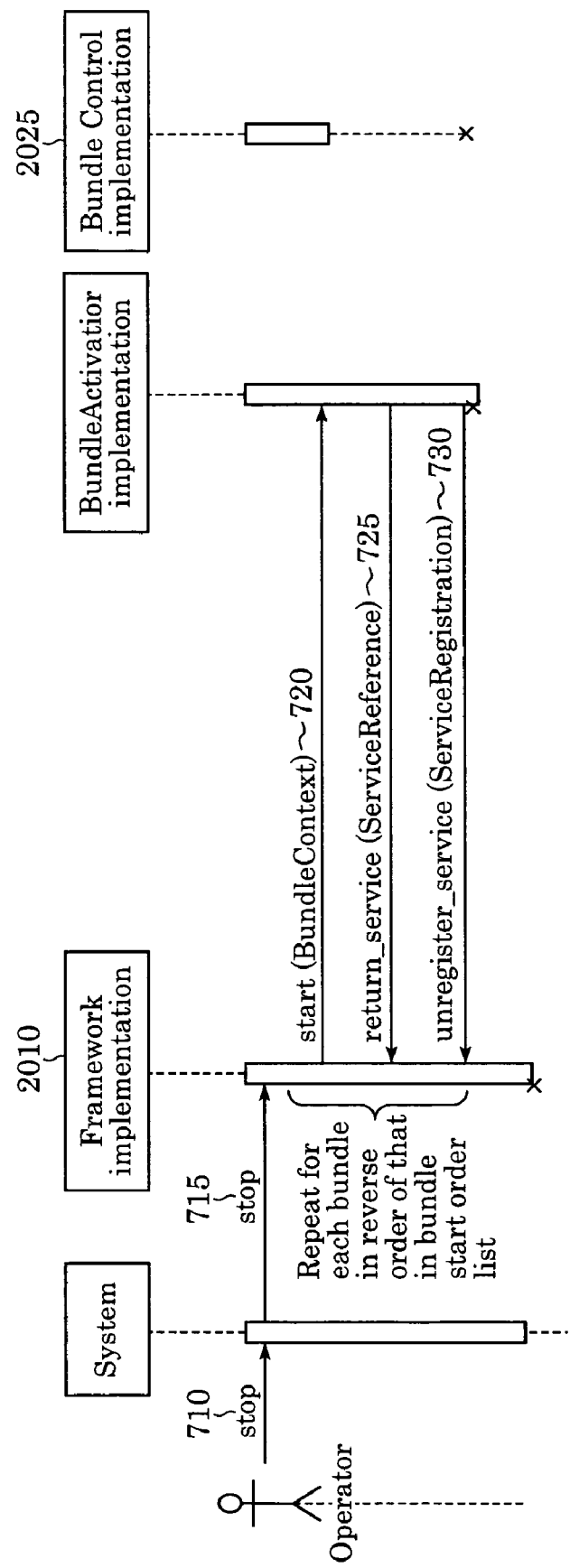
FIG. 7 is a flow chart of a process for shutting down a system according to a first embodiment of the present invention.

The system shutdown process is described next with reference to FIG. 7. In this embodiment, the termination order of program modules is defined at software system shutdown time. The program modules are terminated in accordance with the order (following the defined order). The termination order is an order in relation to the start order of the program modules (i.e., in the reverse order of the start order defined by the bundle start order list).

When attempting to shut down the system (step S710), the system invokes a stop method of the framework implementation class 2010 (step 715).

The framework implementation class 2010 refers to the bundle start order list (see FIG. 8), which the framework implementation class 2010 input from a permanent storage area at system start-up time and holds. The bundle start order list is updated every time a bundle is started and terminated.

The framework implementation class 2010 refers to the bundle start order list shown in FIG. 8 in the reverse order so as to stop the bundles 1040, starting from the most recently started to the oldest one (steps 720, 725, and 730). This termination method (steps 720, 725, and 730) is identical to the regular bundle termination method (steps 555, 560, 565, 570, and 575) except that the mode (the "RESOLVED" mode set to the mode field in the entry of the bundle list corresponding to the bundle 1040 at step 575) is not saved. At a restart time of the system, the framework implementation class 2010 refers to the mode permanently recorded in the mode field in the entry of the bundle list corresponding to the bundle 1040 to determine whether the target bundle 1040 is started or not.

Accordingly, if the mode of the bundle 1040, which is permanently recorded, is changed to the "RESOLVED" mode (i.e., a bundle termination mode) during the system shutdown process, as in the bundle termination process carried out by the operator's explicit instruction, all of the bundles will be in a termination mode when the system starts up next time. In this embodiment, to prevent this situation, the mode of the bundle is not permanently saved during the system shutdown process.

Additionally, the termination process of a bundle 1040 must be completed before the termination process of the next bundle 1040 starts.

In this embodiment, the bundle start order list shown in FIG. 8 is provided to store the start order of the bundles 1040. However, if the system has no function that changes the start order, and therefore, if the start order remains unchanged from the installed order, the present invention can be achieved by terminating the running bundles in the reverse order of the bundle list entries (see FIG. 8).

However, when the system supports a dynamic reference package, this is not true. The reason is as follows. In general, an interface of a service provided by a bundle 1040 is contained in a package provided by the bundle 1040 via the provided package 3030 in order to allow other bundles to externally access the interface. Therefore, a bundle that uses the service should specify a package that defines the interface of the service in the static reference package 3020. Consequently, in a system that does not support the dynamic reference package 3040, since package reference is resolved at an install time of the bundle 1040, the bundle 1040 that uses the service must be installed after the bundle 1040 that provides the service and the interface of the service is installed. Thus, by terminating the bundles, starting from the most recently installed to the oldest one, the bundle 1040 that refers to the service can be stopped earlier. That is, when a dynamic reference package is not supported and when bundles 1040 are terminated in the reverse order of that installed, the safe termination order is not always assured.

Furthermore, in this embodiment, the termination order results from the reverse order of the start order. However, to perform more precise control, a termination order list may be generated from the start order list while reversing the order, and a system administrator may modify the termination order list to control the termination order of bundles.

Second Embodiment

A second embodiment is described next.

The second embodiment including the software configuration is identical to the first embodiment except for the system shutdown process.

Figure 9:
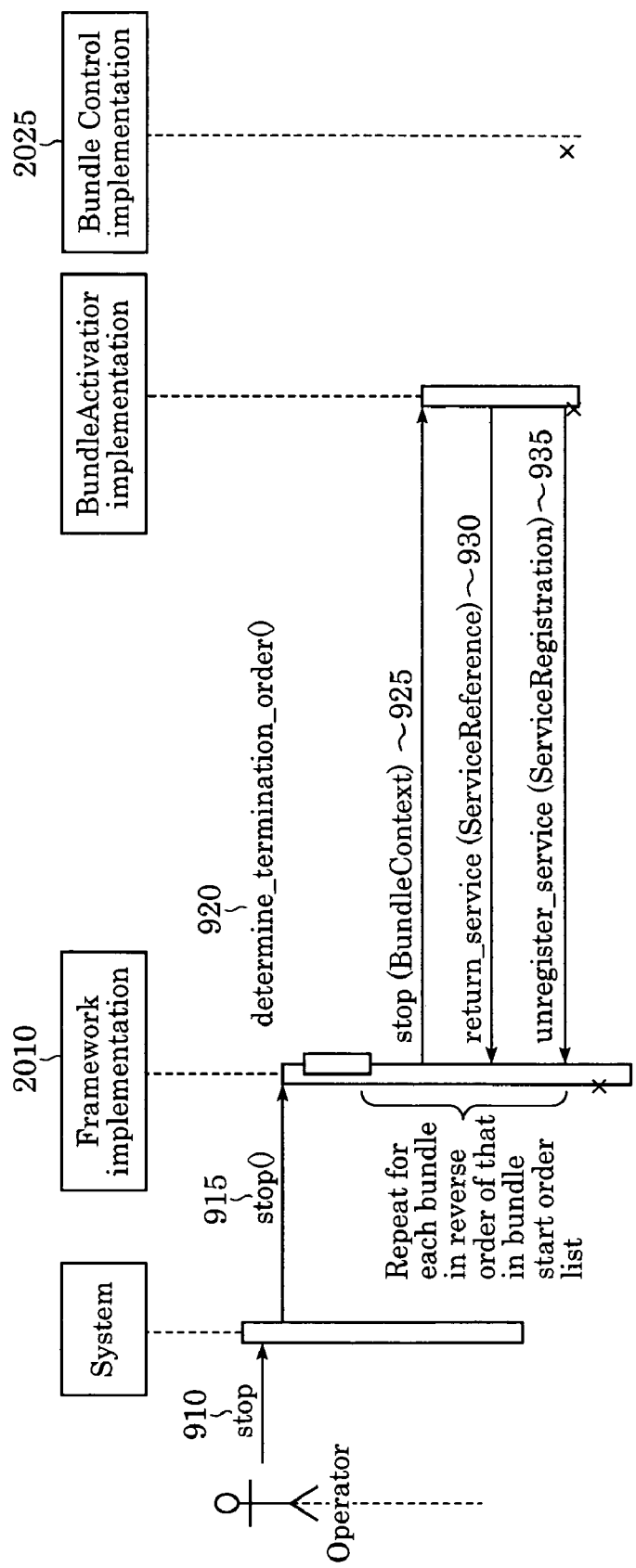
FIG. 9 is a flow chart of a process for shutting down a system according to a second embodiment of the present invention.

The system shutdown process is described with reference to a flow diagram in FIG. 9 and two examples in FIG. 10. In this embodiment, a dependency structure tree of program modules is derived from a dependency relationship among the program modules. By searching the tree structure, the termination order is defined such that a program module having a dependency on another program module is terminated first.

When attempting to shut down the system (step 910), the system invokes a "stop" method of the framework implementation class 2010 (step 915).

The framework implementation class 2010 invokes its own termination-order determination method (step 920).

The termination-order determination method acquires the reference service 3050 and the providing service 3060 from each bundle installed in the bundle control implementation class 2025. The termination-order determination method then creates a directed graph of a relationship between services from data in the reference service 3050 and the providing service 3060. Edges of the directed graph have a direction from a bundle providing a service to a bundle referencing the service.

Figure 10:
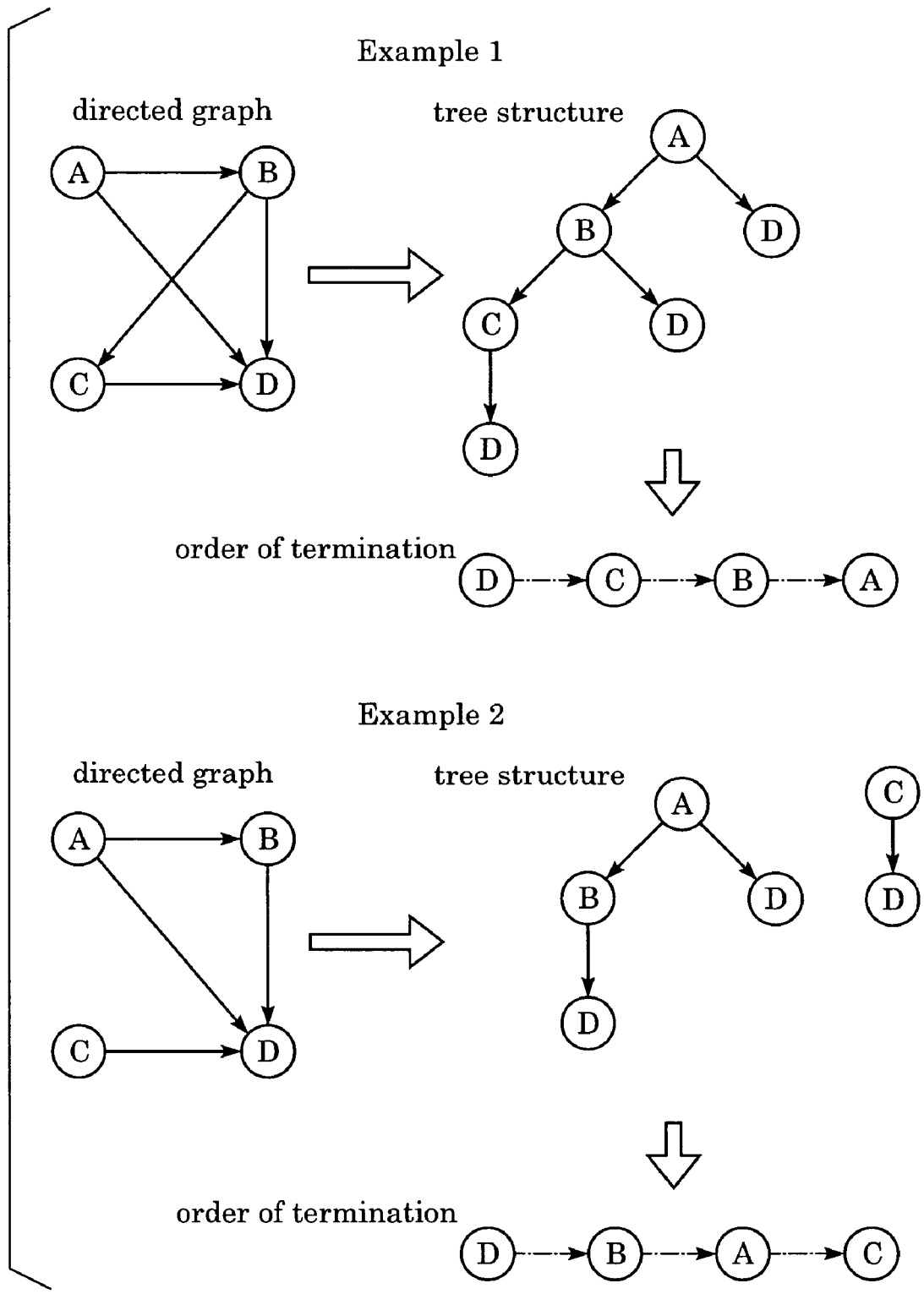
FIG. 10 illustrates a directed graph and a tree structure used for determining a termination order of bundles.

Examples of the directed graph are shown on the left side in FIG. 10. In these examples, among four bundles A, B, C, and D, the bundles B and D reference a service provided by the bundle A. The bundles C and D reference a service provided by the bundle B. The bundle D also references a service provided by the bundle C. The orders of installation of bundles are bundles A, B, C, and D.

Figure 11:
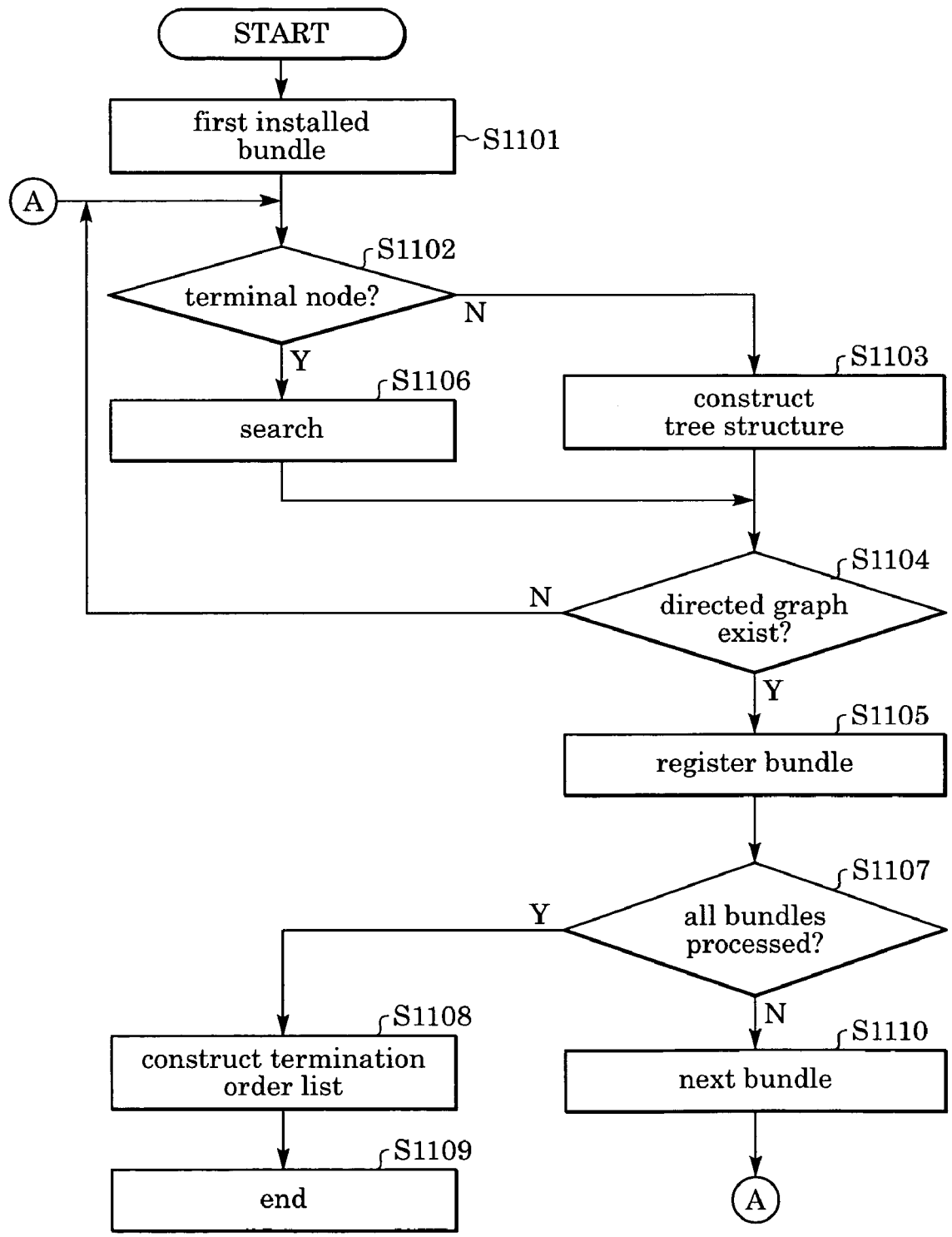
FIG. 11 is a detailed flow chart of a process for shutting down a system according to the second embodiment.

The tree structures shown on the right side in FIG. 10 are derived from the directed graphs. The algorithm to construct the tree structure is described next with reference to FIG. 11.

By referencing the bundle list, each bundle is sequentially processed in the order of installation (step S1101).

If a bundle to be processed is not a terminal node (step S1102), that is, if a bundle to be processed does not reference a service provided by another bundle (e.g., the bundle A in Examples 1 and 2, or the bundle C in Example 2), a new tree structure is created in which the bundle to be processed becomes a root node (step S1103). If a bundle to be processed is a starting node in a directed graph (step S1104), bundles directed by the edges (in Example 1, the bundle A directs the bundles B and D) are sequentially registered in the installed order as child nodes of the bundle to be processed (step S1105). The child nodes are considered to be a first child, a second child, and a third child in the installed order. Thus, these child nodes are lined up from the left in descending order of the installation thereof. That is, in Example 1, the child nodes B and D are lined up from the left in descending order of the installation thereof.

On the other hand, if a bundle to be processed is a terminal node in a directed graph (e.g., the bundle B in Examples 1 and 2) (step S1102), the created tree structures are processed in the order of the creation thereof. The tree structure is searched on a depth-first basis (i.e., is searched from the lower layer) to find a node to which the bundle to be processed (e.g., the bundle B) is assigned (step S1106). If the bundle to be processed is a starting node in a directed graph (step S1104), bundles directed by the edges (in Example 1, the bundle B directs the bundles C and D) are sequentially registered in the installed order as child nodes of the bundle to be processed (step S1105). The child nodes are considered to be a first child, a second child, and a third child in the installed order. Thus, these child nodes are lined up from the left in descending order of the installation thereof. That is, in Example 1, the child nodes C and D are lined up from the left in descending order of the installation thereof.

If an unprocessed bundle is found (step S1107), the next bundle is processed in the order of the installation thereof (step S1110). Thus, the tree structures shown in FIG. 10 are derived.

If an unprocessed bundle is not found (step S1107), the derived tree structures are used in the order of their creation (in Example 2, the tree structure having the bundle A as a root node is used first, and then the tree structure having the bundle C as a root node is used) to generate a termination order list by searching each tree structure on a depth-first basis (i.e., is searched from the lower layer) (step S1108) and then the algorithm ends (step S1109). In Example 2 shown in FIG. 10, a termination order list includes D, B, and A, which are searched from the lower layer in the tree structure having the bundle A as a root node, and C, which is searched from the lower layer in the tree structure having the bundle C as a root node. If a node is a bundle not listed in the termination order list, the node is appended to the end of the termination order list. That is, a dependency relationship among program modules defined by the reference service 3050 and the providing service 3060 acquired by the termination-order determination method is statically defined. Tree structures representing the dependency relationship among the program modules are derived from the defined dependency relationship. By searching the tree structures, a termination order list is then determined so that a program module depending on another program module is terminated first.

Thus, the bundles registered in the created termination order list are sequentially terminated. The termination processing method of the bundle 1040 (steps 925, 930, and 935) is identical to the regular termination processing method (i.e., steps 555, 560, 565, 570, and 575) except that a state is not stored, that is, the "RESOLVED" state is not set to the state field in the corresponding entry of the bundle list.

As described above, in this embodiment, when the software system is shut down, a program module depending on another program module is first terminated based on tree structures representing a dependency relationship among program modules derived from the dependency relationship among the program modules.

Third Embodiment

A third embodiment of the present invention is described next. In the third embodiment, tree structures representing a dependency relationship among program modules are also derived from the dependency relationship among the program modules. By searching the tree structures, the termination order is then determined so that a program module depending on another program module is terminated first.

As in the second embodiment, a directed graph is generated from a statically determined reference relationship among services, and tree structures are then generated. That is, in this embodiment, a dependency relationship among program modules defined by the reference service 3050 and the providing service 3060 acquired by the termination-order determination method is also statically defined. A tree structure representing the dependency relationship among the program modules is derived from the defined dependency relationship.

In this embodiment, the termination order of bundles is determined from the constructed tree structure by using the following algorithm.

The termination order determination algorithm according to this embodiment is described with reference to FIG. 12. In this embodiment, a weight, which is a positive integer, can be assigned to a node of the tree structure.

The tree structure is searched on a depth-first basis (i.e., is searched from the lower layer), and a weight of 1 is assigned to a leaf portion (i.e., a bundle not referenced by another bundle: C and D in this example).

To determine the weight of a node, after a weight is assigned to every child node (every bundle referenced by the target bundle), the largest weight among the weights of the child nodes is incremented by 1. The resultant value is considered to be the weight of the node. For example, to determine the weight of a node A, the largest weight (i.e., 2) among the weights of the nodes B and C (i.e., 2 and 1) is incremented by 1. The resultant value (i.e., 3) is determined to be the weight of the node A.

Thus, a weight is assigned to every node.

Figure 12:
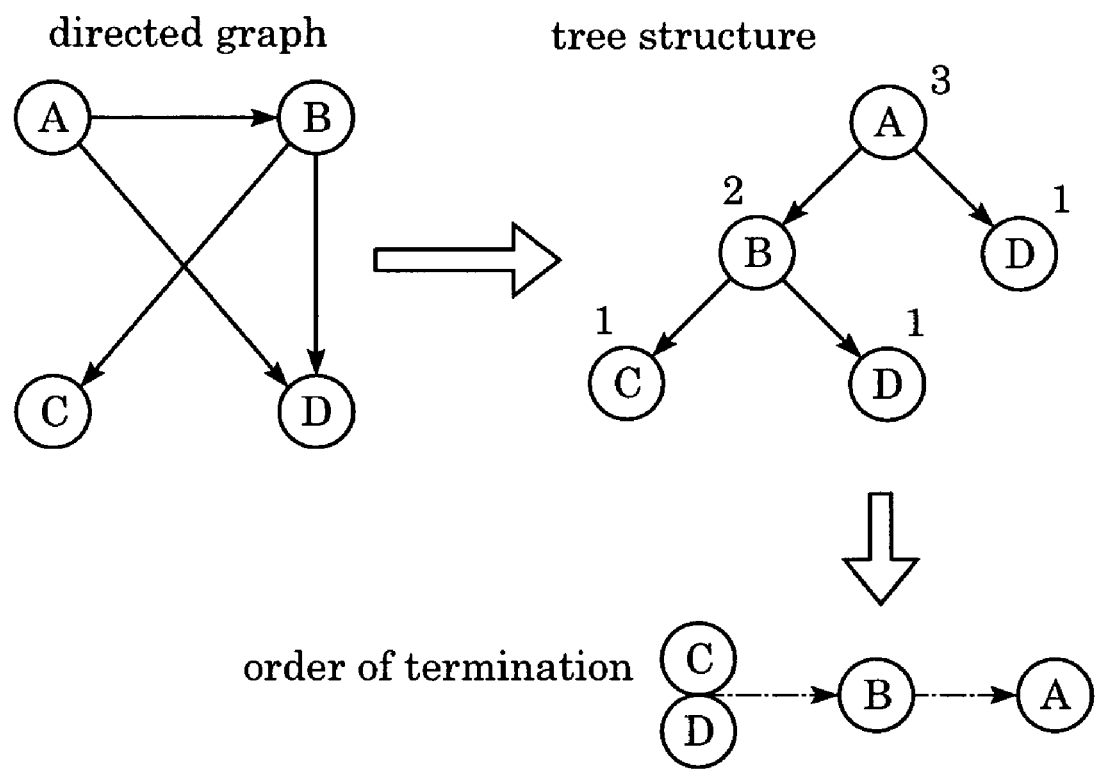
FIG. 12 illustrates examples of a directed graph and a tree structure according to a third embodiment of the present invention.

A tree structure shown on the right in FIG. 12 is derived from a directed graph shown on the left in FIG. 12. A weight (number) of each node is written on the shoulder of the each node.

A termination order list is determined so that the bundles are lined up in ascending order of the weight thereof. That is, by searching the tree structure representing a dependency relationship of the program modules, a termination order list is determined so that a program module depending on another program module is terminated first. In this embodiment, a minimum weight (1 in this example) is assigned to a leaf portion of the derived tree structure. The largest weight among the weights of the child nodes is incremented by a predetermined value (1 in this example). The resultant weight is assigned to the target node. The program modules are lined up in the order from a program module having a minimum weight to that having a maximum weight to define the termination order.

The bundle termination process is executed in ascending order of the weight. To carry out the bundle termination process for bundles having the same weight, a different thread may be generated to concurrently carry out the bundle termination processes for the two bundles. However, to start carrying out the bundle termination process for a bundle having the next smaller weight, the termination of the thread process carrying out the termination process for the bundle having the smaller weight is awaited.

As described above, in this embodiment, when the software system is shut down, a program module depending on another program module is terminated first based on tree structures representing a dependency relationship among program modules derived from the dependency relationship among the program modules.

Fourth Embodiment

A fourth embodiment of the present invention is described next.

In the second and third embodiments, a reference relationship between services is derived from static information defined in the bundle file. However, in this embodiment, the termination order is determined by a dynamically changing reference relationship between services.

Figure 13:
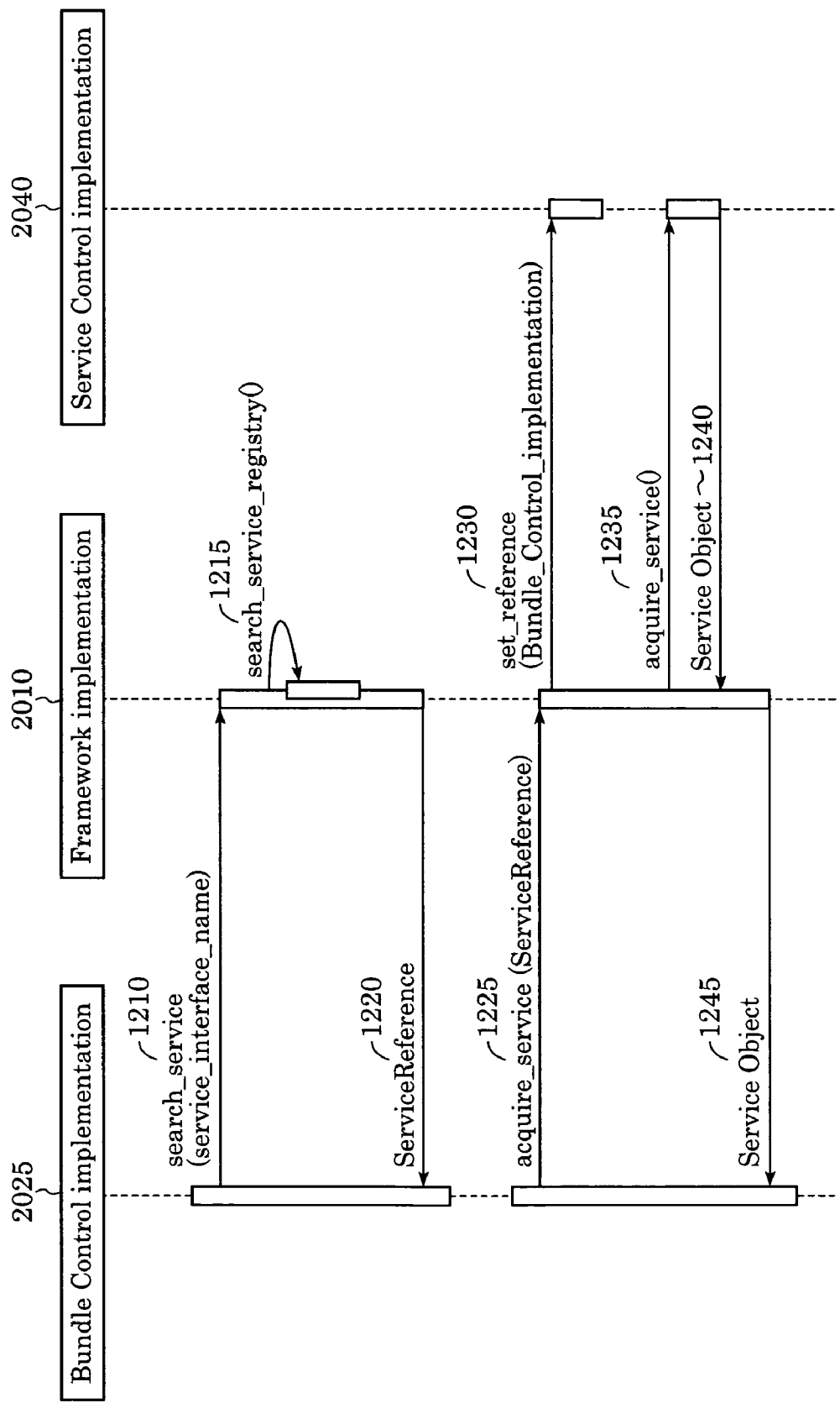
FIG. 13 is flow chart of a process for acquiring a service according to a fourth embodiment of the present invention.

Before discussing the termination-order determination method according to this embodiment, a process for acquiring a service is described with reference to FIG. 13.

As shown in FIG. 5, in general, a service provided by the bundle 1040 registers with the framework implementation class 2010 when the bundle 1040 is started. The registered service is then registered in a service registry constructed in the framework implementation class 2010 as the serviceReference interface 2055 to manage the service. That is, the service registry constructed in the framework implementation class 2010 manages a service, which is a function of a program module used for another program module. The serviceReference interface 2055 stores the bundle control implementation class 2025 for the bundle 1040 providing the service.

When another bundle 1040 uses a registered service, the bundle 1040 first requests the framework implementation class 2010 to search for ServiceReference interface 2055 of the service by specifying the name of the service interface that defines the service (step 1210).

The framework implementation class 2010 searches the service registry to find a ServiceReference object of the service implementing the specified service interface (step 1215). The framework implementation class 2010 then returns the ServiceReference object as a return value (step 1220). That is, the bundle control implementation class 2025 searches for the service registered in the service registry constructed in the framework implementation class 2010 and acquires the service in a usable form.

Additionally, when the bundle 1040 acquires the service object implementing the service interface and uses the service, the bundle 1040 requests the framework implementation class 2010 to acquire a service object by using the searched and found serviceReference interface 2055 as an argument (step 1225).

The framework implementation class 2010 instructs the serviceReference interface 2055, which is passed as an argument, to store, as a reference relationship, the event that the bundle requesting the acquisition of the service object will use the service (step 1230). In this instruction, the bundle control implementation class 2025 of the requesting bundle 1040 is specified as an argument. Thereafter, the framework implementation class 2010 acquires the service object from the serviceReference interface 2055 (steps 1235 and 1240) and returns the service object to the bundle 1040 that requested the service object (step 1245).

Thus, each serviceReference interface 2055 stores which bundle is using a service managed by this serviceReference interface 2055.

Figure 14:
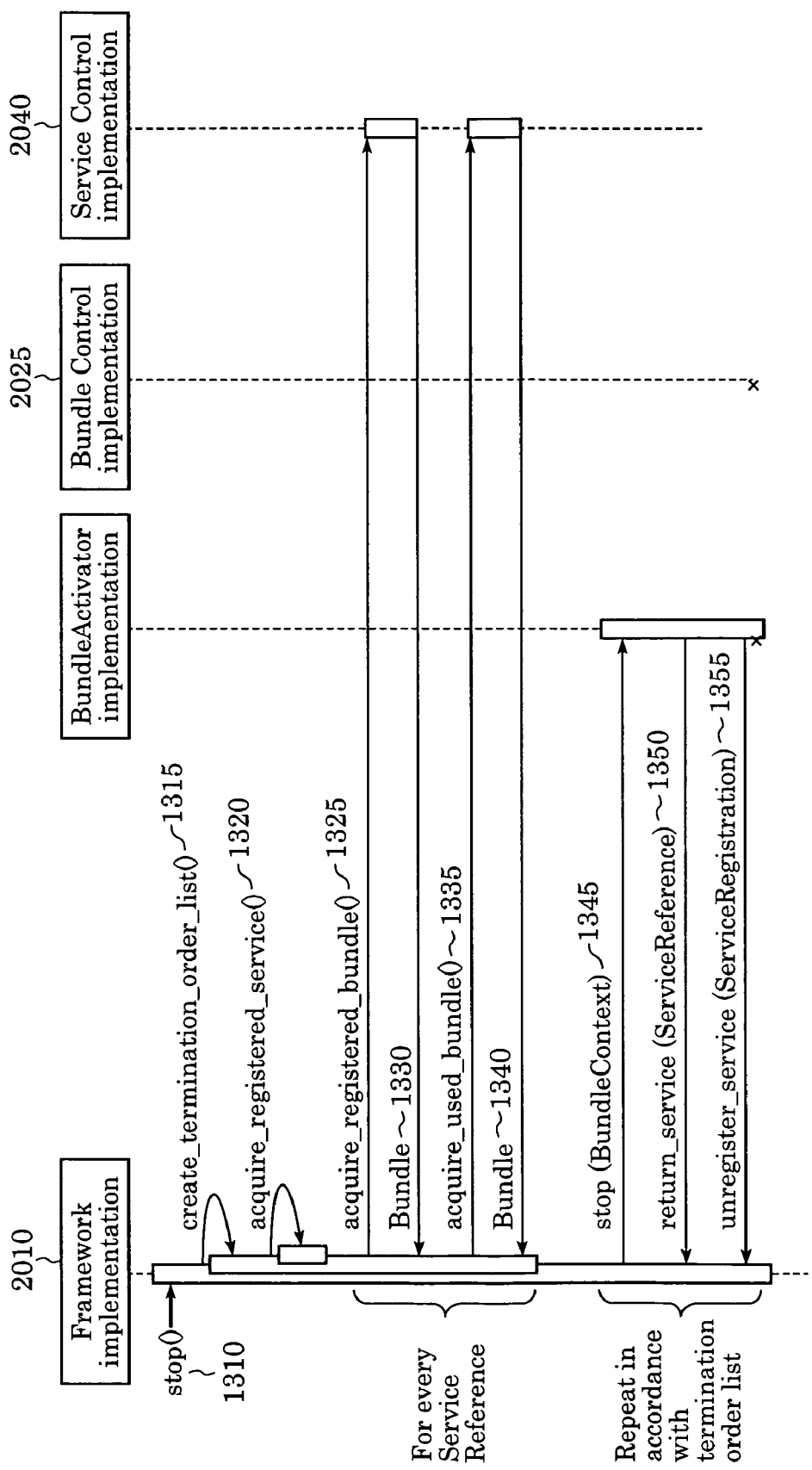
FIG. 14 is a flow chart of a process for shutting down a system according to the fourth embodiment.

The system shutdown process according to this embodiment is described with reference to FIG. 14.

As in the above-described embodiments, the framework implementation class 2010, at step 1315, generates a termination order list of bundles 1040 using a stop method (step 1310). In this embodiment, the termination order list is generated as follows:

The framework implementation class 2010 acquires all of the services registered in a service registry constructed in the framework implementation class 2010 (step 1320) and then acquires the bundles that register the services and the bundles that use the services (steps 1325, 1330, 1335, and 1340). That is, the framework implementation class 2010 asks the service registry constructed in the framework implementation class 2010 to receive a pair of registered bundle and used bundle of the service. The framework implementation class 2010 creates a directed graph in which an edge is directed from the bundle that registers the service to the bundle that uses the service.

A termination order list is generated from the created directed graph using a process identical to that of the second or third embodiment. That is, a tree structure representing a service usage relationship among program modules is derived from the service usage relationship. By searching the tree structure, a termination order list is then determined so that a program module not used by another program module is terminated first.

When the termination order list is generated from the created directed graph in the same manner as the third embodiment, a minimum weight is assigned to a leaf portion of the derived tree structure. The largest weight among the weights of the child nodes is incremented by a predetermined value. The resultant weight is assigned to the target node. The program modules are lined up in the order from a program module having a minimum weight to that having a maximum weight to define the termination order. Additionally, program modules having the same weight may be terminated concurrently.

Furthermore, a flag may be provided in each serviceReference interface 2055 to indicate that a bundle that references a service need not be terminated prior to a bundle that registers the service. The termination order can be determined without reflecting a reference relationship to the directed graph for the service having the flag set.

As described above, in this embodiment, when the software system is shut down, a program module whose provided service is not used by another program module is terminated first based on a service usage relationship among program modules (a tree structure representing the service usage relationship derived from the service usage relationship among the program modules).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-245094 filed Aug. 25, 2004, which is hereby incorporated by reference herein in its entirety.

What is claimed is:

1. An apparatus having a software system, the apparatus comprising:
   computer hardware configured to operate according to instructions of the software system to provide:
   starting means for starting program modules;
   detecting means for detecting a service provided by a first program module;
   receiving means for receiving a request generated by a second program module when the second program module uses the service provided by the first program module which is detected by the detecting means:
   storage means for storing information indicating that the second program module uses the service provided by the first program module, at a time when the request generated by the second program module is received by the receiving means;
   derivation means for deriving a tree structure representing a dependency relationship among program modules from a dependency relationship among the program modules based on the information stored by the storage means; and
   terminating means for determining a weight to be assigned to a program module by adding a predetermined value to a weight of a child node of the program module, and for terminating the program modules started by the starting means in an order based on the derived tree structure and the assigned weights.

2. The apparatus according to claim 1, wherein the terminating means concurrently terminates program modules having the same weight.

3. An apparatus having a software system, the apparatus comprising:
   computer hardware configured to operate according to instructions of the software system to provide:
   receiving means for receiving a request generated by a first program module when the first program module uses a service provided by a second program module;
   storage means for storing first information indicating that the second program module registers the service, and for storing second information indicating that the first program module uses the service, at a time when the request generated by the first program module is received at the receiving step;
   derivation means for deriving a tree structure representing a usage relationship between the program modules from the first and second information; and
   terminating means for determining a weight to be assigned to a program module by adding a predetermined value to a weight of a child node of the program module, and for terminating the program modules in an order based on the derived tree structure and the assigned weights.

4. The apparatus according to claim 3, wherein the terminating means concurrently terminates the program modules having the same weight.

5. A method for terminating program modules in a software system, comprising:
   a starting step for starting program modules;
   a detecting step for detecting a service provided by a first program module;
   a receiving step for receiving a request generated by a second program module when the second program module uses the service provided by the first program module which is detected at the detecting step:
   a storage step of storing information indicating that the second program module uses the service provided by the first program module, at a time when the request generated by the second program module is received at the receiving step;
   a derivation step of deriving a tree structure representing a dependency relationship among program modules from a dependency relationship among the modules based on the information stored in the storage step; and
   a terminating step for determining a weight to be assigned to a program module by adding a predetermined value to a weight of a child node of the program module, and for terminating the program modules started at the starting step in an order based on the derived tree structure and the assigned weights.

6. A method for terminating program modules in a software system, comprising:
   a receiving step for receiving a request generated by a first program module when the first program module uses a service provided by a second program module;
   a first storage step for storing first information indicating that the second program module registers the service;
   a second storage step for storing second information indicating that the first program module uses the service, at a time when the request generated by the first program module is received at the receiving step;
   a derivation step for deriving a tree structure representing a usage relationship between the program modules from the first and second information; and
   a terminating step for determining a weight to be assigned to a program module by adding a predetermined value to a weight of a child node of the program module, and for terminating the program modules in an order based on the derived tree structure and the assigned weights.

* * * * *